United States Patent
Sadowsky

(10) Patent No.: US 7,308,047 B2
(45) Date of Patent: Dec. 11, 2007

(54) SYMBOL DE-MAPPING METHODS IN MULTIPLE-INPUT MULTIPLE-OUTPUT SYSTEMS

(75) Inventor: John S. Sadowsky, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 10/750,169

(22) Filed: Dec. 31, 2003

(65) Prior Publication Data

US 2005/0141644 A1 Jun. 30, 2005

(51) Int. Cl.
*H04L 27/00* (2006.01)

(52) U.S. Cl. .................................... 375/324

(58) Field of Classification Search ............... 375/259, 375/260, 261, 267, 269, 279, 324, 329, 330, 375/331, 332, 333; 370/207; 332/103
See application file for complete search history.

(56) References Cited

U.S. PATENT DOCUMENTS

| | | | |
|---|---|---|---|
| 2003/0012315 A1* | 1/2003 | Fan ............................ | 375/349 |
| 2003/0236076 A1* | 12/2003 | Brunel ........................ | 455/101 |
| 2004/0052317 A1* | 3/2004 | Love et al. .................. | 375/340 |
| 2004/0066866 A1* | 4/2004 | Tong et al. .................. | 375/347 |

OTHER PUBLICATIONS

"International Search Report filed in corresponding PCT Application No. PCT/US2004/043089",(May 5, 2005), 3 pgs.
Cui, T., et al., "Approximate ML Detection for MIMO Systems Using Multistage Sphere Decoding", *Signals, Systems & Computers*, 1, Conference Record of the 38th Asilomar Conference on Pacific Grove (IEEE),(2004), 1054-1056.
Garret, D. C., et al., "19.2 Mbit/s 4x4 Blast/MIMO Detector with Soft ML Outputs", *Electronics Letters, IEE Stevenage*, 39(2), (2003), 233-235.
Garret, D., et al., "APP Processing for High Performance MIMO Systems", *Proceedings of the IEEE 2003 Custom Integrated Circuits Conference ( CICC 2003)*, vol. Conf. 25, 2003), 271-274.
Rupp, M., et al., "Approximate ML Detection for MIMO Systems with Very Low Complexity", *Acoustics, Speech& Signal Processing*,2004,4, Proceedings (ICASSP'04), IEEE Inter. Conf. on Montreal Quebec, (2004), 809-812.
Viterbo, E., et al., "A Universal Lattice Code Decoder for Fading Channels", *IEEE Transactions on Information Theory*, 45(5), (1999), 1639-1642.

* cited by examiner

*Primary Examiner*—Sam K. Ahn
(74) *Attorney, Agent, or Firm*—Schwegman, Lundberg & Woessner, P.A.

(57) ABSTRACT

In a multiple-input multiple-output (MIMO) system, multiple receive antennas produce a received signal vector, Y, which includes an element for each of the receive antennas. In an embodiment of a de-mapping method performed within a MIMO receiver, a quadrature phase shift keying (QPSK) search is performed within a search space that includes the full constellation of symbol points. Based on the results of the QPSK search, the search space is reduced to fewer than all of the quadrants, and the received signal vector data is scaled and transformed to the reduced search space. A lower-level QPSK search is performed, and the process is repeated until the modulation order is reduced to a QPSK constellation. Hard or soft decisions corresponding to the search results may then be passed to a decoder.

28 Claims, 8 Drawing Sheets

| | | | | | | | |
|---|---|---|---|---|---|---|---|
| 604↘ | | | | | | | ↙608 |
| 000100 | 001100 | 011100 | 010100 | 110100 | 111100 | 101100 | 100100 |
| 000101 | 001101 | 011101 | 010101 | 110101 | 111101 | 101101 | 100101 |
| 000111 | 001111 | 011111 | 010111 | 110111 | 111111 | 101111 | 100111 |
| 000110 | 001110 | 011110 | 010110 | 110110 | 111110 | 101110 | 100110 |
| 000010 | 001010 | 011010 | 010010 | 110010 | 111010 | 101010 | 100010 |
| 000011 | 001011 | 011011 | 010011 | 110011 | 111011 | 101011 | 100011 |
| 000001 | 001001 | 011001 | 010001 | 110001 | 111001 | 101001 | 100001 |
| 000000 | 001000 | 011000 | 010000 | 110000 | 111000 | 101000 | 100000 |

600 ↗ (horizontal axis), 602 ↙, 606 ↘

*FIG. 6*

SYMBOL DE-MAPPING METHODS IN MULTIPLE-INPUT MULTIPLE-OUTPUT SYSTEMS

TECHNICAL FIELD

The inventive subject matter pertains to data communications and, more particularly, to receiver apparatus and symbol de-mapping methods in multiple-input multiple-output (MIMO) systems.

BACKGROUND

Due to an ever-increasing demand for wireless communication services, system developers continually strive to increase the capacities of wireless systems. This is particularly true, for example, in cellular telephone systems and wireless local area network (WLAN) systems. To increase system capacities, multiple-input multiple-output (MIMO) technologies are being developed for cellular telephone and WLAN applications.

In a MIMO system, a MIMO transmitter includes multiple transmit antennas for data transmission, and a MIMO receiver includes multiple receive antennas for data reception. When signals are simultaneously transmitted by multiple antennas that are spaced more than a coherence distance apart, the signals will each have distinct spatial signatures. The coherence distance is the minimum spatial separation of antennas for independent fading, and its value depends on the angle spread of the multi-paths arriving at or departing from an antenna array. A MIMO system may provide for increased system capacity and/or quality, compared with known technologies, by exploiting the spatial diversity between the multiple antennas within an antenna array. MIMO system developers continue to try to increase system capacities by developing MIMO processing technologies that yield acceptable system performance.

BRIEF DESCRIPTION OF THE DRAWINGS

The appended claims point out, with particularity, different embodiments of the inventive subject matter described herein. However, the detailed description presents a more complete understanding of various embodiments of the inventive subject matter when considered in connection with the figures, wherein like-reference numbers refer to similar items throughout the figures and:

FIG. 6 illustrates a 64 QAM constellation pattern;

DETAILED DESCRIPTION

Various embodiments of the inventive subject matter described herein include methods and apparatus for de-mapping and de-modulating multiple-input multiple-output (MIMO) symbols. Embodiments of the inventive subject matter may be referred to individually and/or collectively herein by the term "invention." Use of this term is merely for convenience and is not intended to voluntarily limit the scope of this application to any single invention or inventive concept if more than one is disclosed.

Examples of various electronic systems and devices in which embodiments of the invention can be incorporated include, but are not limited to, wireless local area network (WLAN) systems, cellular telephone systems, radio networks, computers (e.g., desktop, laptop, hand-held, server, etc.), and wireless communication devices (e.g., cellular telephones, pagers, radios, etc.), to name a few. Embodiments of the invention could be used in other types of systems and/or devices, as well, as would be apparent to one of skill in the art based on the description herein. The inventive subject matter described herein is not intended to be limited to those systems and devices that are described herein.

Figure 1:
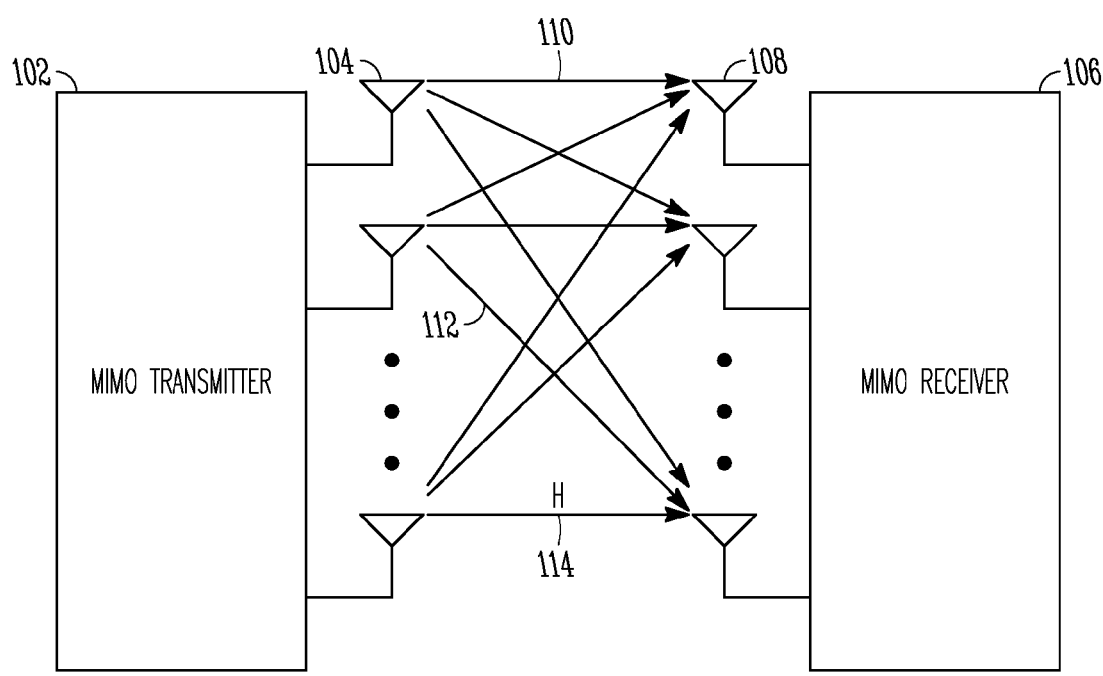
FIG. 1 is a simplified diagram illustrating multi-path communications between a MIMO transmitter and a MIMO receiver, in accordance with an embodiment of the invention.

FIG. 1 is a simplified diagram illustrating multi-path communications between MIMO devices 102, 106, in accordance with an embodiment of the invention. Although only two devices 102, 106 are illustrated, a MIMO system can include a plurality of devices 102, 106. A device 102, 106 may be mobile, portable or stationary. One or more devices 102, 106 may be included within a network access point, a portable or stationary computer (e.g., a laptop, desktop or server computer), a cellular telephone, a handheld radio, or numerous other types of devices having the ability to perform simplex or duplex communications with other devices over a wireless medium.

Each device 102, 106 may include a transmitter, a receiver or both. Where devices 102, 106 include both a transmitter and a receiver, duplex communications can be supported. For purposes of description, device 102 is referred to, below, as a transmitter, and device 106 is referred to as a receiver. However, it is to be understood that devices 102, 106 also can include one or more receivers and transmitters, respectively. The detailed description herein discusses an example of a single-user communication model with a point-to-point link between the transmitter 102 and receiver 106.

As discussed previously, a MIMO system exploits spatial diversity within its antenna arrays to increase system capacity and/or signal quality. In the example system illustrated in FIG. 1, transmitter 102 is equipped with a number, $n_T$, of transmit antennas 104, and receiver 106 is equipped with a number, $n_R$, of receive antennas 108. The number of transmit antennas and the number of receive antennas may or may not be equal.

Transmitter 102 sends radio-frequency (RF) signals 110, 112, 114 to receiver 106 over a "channel," which typically includes the medium of free space. The input-output relationship of the $n_R \times n_T$ matrix channel is represented by equation (1) as follows:

$$Y = Hx + N \quad (1)$$

where $Y = [y_0 y_1 \ldots y_{n_{R-1}}]^T$ is the $n_R \times n_T$ receive signal vector, H is the $n_R \times n_t$ channel transfer matrix, $x = [x_0 x_1 \ldots x_{n_{T-1}}]^T$ is the $n_T \times 1$ transmit signal vector, and N is a noise vector.

Often, it is the case that the channel transfer matrix is unknown at transmitter 102, but it may be nearly perfectly known and tracked at receiver 106. Channel knowledge at transmitter 102 can be obtained through receiver feedback and/or the use of transmit-receive, duplexing-based channel mapping methods.

One MIMO technique that is used to increase system capacity is referred to as "spatial-multiplexing." The idea of spatial-multiplexing is that the use of multiple antennas at the transmitter and the receiver, in conjunction with rich scattering in the propagation environment, opens up multiple data pipes within the same frequency band. At the transmitter, an input symbol stream is split into multiple independent, lower-rate sub-streams. These sub-streams are modulated to form distinct signals, which are transmitted on separate transmit antennas.

If the transmit antennas are separated in space sufficiently, and if the wireless channel has sufficient multi-path characteristics, then each transmitted symbol sub-stream induces a different spatial signature on a receiver antenna array. If the spatial signatures of the signals induced at the receiver antennas are well separated, then the receiver can separate the multiple transmitted signals to yield estimates of the sub-streams. The sub-streams are then re-combined to form an estimate of the original symbol stream. The use of spatial-multiplexing yields a potentially linear (i.e., in the number of antennas) increase in capacity.

The modulation symbols typically map to a standard constellation, such as BPSK (bipolar phase shift keying) or a rectangular QAM (quadrature amplitude modulation) constellation. Rectangular QAM constellations include, for example, QPSK (quadrature phase shift keying), 16 QAM, 64 QAM, 256 QAM, and the like. Using rectangular QAM modulation, the transmit signal vector, x, and the receive signal vector, Y, are vectors of complex modulation symbols.

Figure 2:
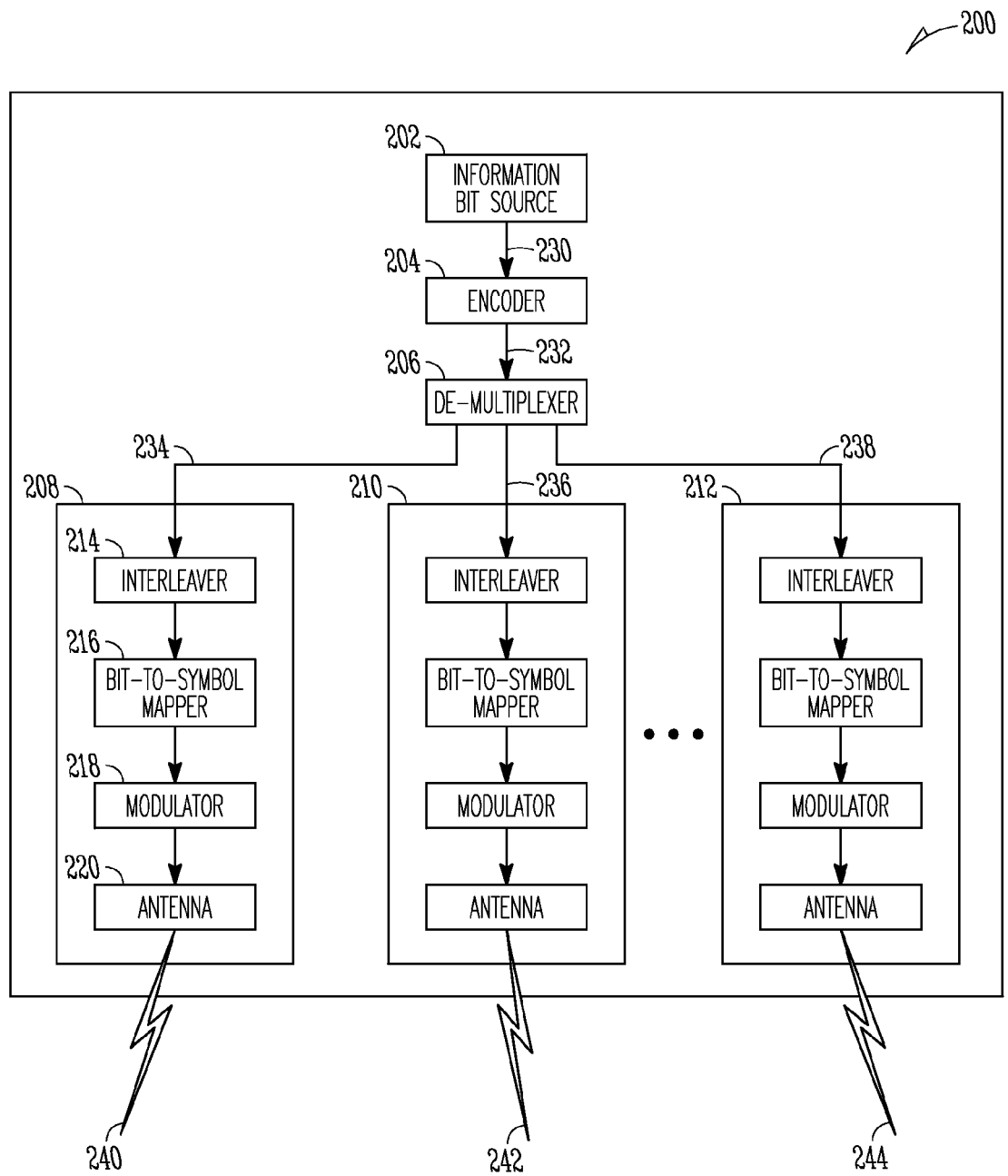
FIG. 2 is a simplified block diagram of a MIMO device capable of modulating and transmitting a symbol stream using spatial-multiplexing techniques, in accordance with an embodiment of the invention.

FIG. 2 is a simplified block diagram of a MIMO device 200 capable of encoding, modulating, and transmitting a symbol stream using spatial-multiplexing techniques, in accordance with an embodiment of the invention. In one embodiment, device 200 includes an information bit source 202, an encoder 204, a de-multiplexer 206, and multiple antenna subsystems 208, 210, 212. Although three antenna subsystems 208, 210, 212 are illustrated in FIG. 2, more or fewer antenna subsystems can be included, in other embodiments.

Information bit source 202 produces a bit stream 230. Information bit source 202 can be a higher-level layer of a communications architecture (e.g., a medium access control (MAC) layer) or a bit source of another type. Information bit source 202 can include, for example, one or more general-purpose or special-purpose processors, application-specific integrated circuits (ASICs), multi-chip modules, combinations thereof, or other devices.

Bit stream 230 can be continuous or intermittent. Bit stream 230 can include a variety of different types of information, and the information can be uncompressed or compressed, unencrypted or encrypted, and/or previously subjected to any of a number of packetizing and/or process-ing techniques. In one embodiment, for example, bit stream 230 can include time-division multiple access (TDMA) frames for a multi-user application.

Bit stream 230 is received by encoder 204, which adds redundancy to the information bits to enable detection and correction of bit errors at the receiver. For example, encoder 204 may perform forward error correction (FEC) encoding, among other encoding techniques. Encoder 206 produces a coded bit sequence 232.

The coded bit sequence 232 is received by de-multiplexer 206. De-multiplexer 206 produces $n_T$ (i.e., the number of transmit antennas) space channels 234, 236, 238, which are sub-streams of the coded bit sequence 232. Each of these sub-streams 234, 236, 238 can include different information. The sub-streams 234, 236, 238 are provided to the multiple antenna subsystems 208, 210, 212, respectively.

Antenna subsystems 208, 210, 212 modulate and simultaneously transmit the information within sub-streams 234, 236, 238 within the same frequency band. Antenna subsystems 208, 210, 212 can use a variety of different modulation techniques including, but not limited to, narrowband modulation, OFDM (orthogonal frequency-division multiplexing), and CDMA (code-division multiple access), to name a few.

In one embodiment, each transmit antenna subsystem 208, 210, 212 includes an interleaver 214, a bit-to-symbol mapper 216, a modulator 218, and an antenna 220. In another embodiment, an interleaver and/or a bit-to-symbol mapper can be included in the transmitter between encoder 204 and de-multiplexer 206, rather than within each antenna subsystem 208, 210, 212.

Interleaver 214 receives the coded sub-stream 234 from de-multiplexer 206. Interleaver 214 then permutates the order of the bits, in order to make the transmitted signal more robust.

Bit-to-symbol mapper 216 receives the interleaved sub-stream, and it maps the bits of the sub-stream to a series of symbols. Each symbol corresponds to a set of one or more bits, and each symbol can be represented by a symbol vector. The mapping process depends upon the type of symbol constellation used, and upon the number of points in the constellation. In one embodiment, the symbol vectors are complex vectors that are encoded using BPSK or one of a variety of rectangular QAM techniques including, but not limited to, QPSK, 16 QAM, 64 QAM, 256 QAM, or the like. In an alternate embodiment, the symbol vectors are simple vectors that are encoded using a PAM (pulse amplitude modulation) technique. Various symbol constellation examples are described later, in accordance with FIGS. 4-6.

In one embodiment, the symbol vectors are represented by complex numbers, where each has a phase and an amplitude component. These complex symbol vectors are passed to modulator 218. Modulator 218 converts the symbol vector values into an RF waveform. Accordingly, modulator 218 applies a modulation procedure (e.g., OFDM or CDMA), converts the modulated signals into the analog time domain (e.g., using an inverse Fast Fourier Transform (FFT)), performs various filtering and amplification procedures, and up-converts the signal to an RF frequency.

At least a portion of the modulator architecture depends on the modulation technology employed. For example, if OFDM is used to modulate the symbols, each modulator 218 can include a serial-to-parallel (S-to-P) converter (not shown), which takes a number of vectors from the incoming symbol vector stream and produces multiple output symbols corresponding to the OFDM sub-band channels that are applied to an IFFT (Inverse FFT) to create a time domain signal. For a CDMA system, the modulation symbols are modulated onto a coded waveform. For other modulation techniques, other modulator architectures can be used, as would be obvious to one of skill in the art based on the description herein.

The RF waveform produced by modulator 218 is provided to antenna 220, which transmits the RF signal 240 over the air interface. Each of the other antenna subsystems 210, 212 also produce and transmit RF signals 242, 244 over the air interface. The signals 240, 242, 244 occupy the same frequency band (i.e., they are co-channel signals). If the transmit antennas (e.g., antenna 220) are appropriately spaced, then signals 240, 242, 244 will each have distinct spatial signatures.

Figure 3:
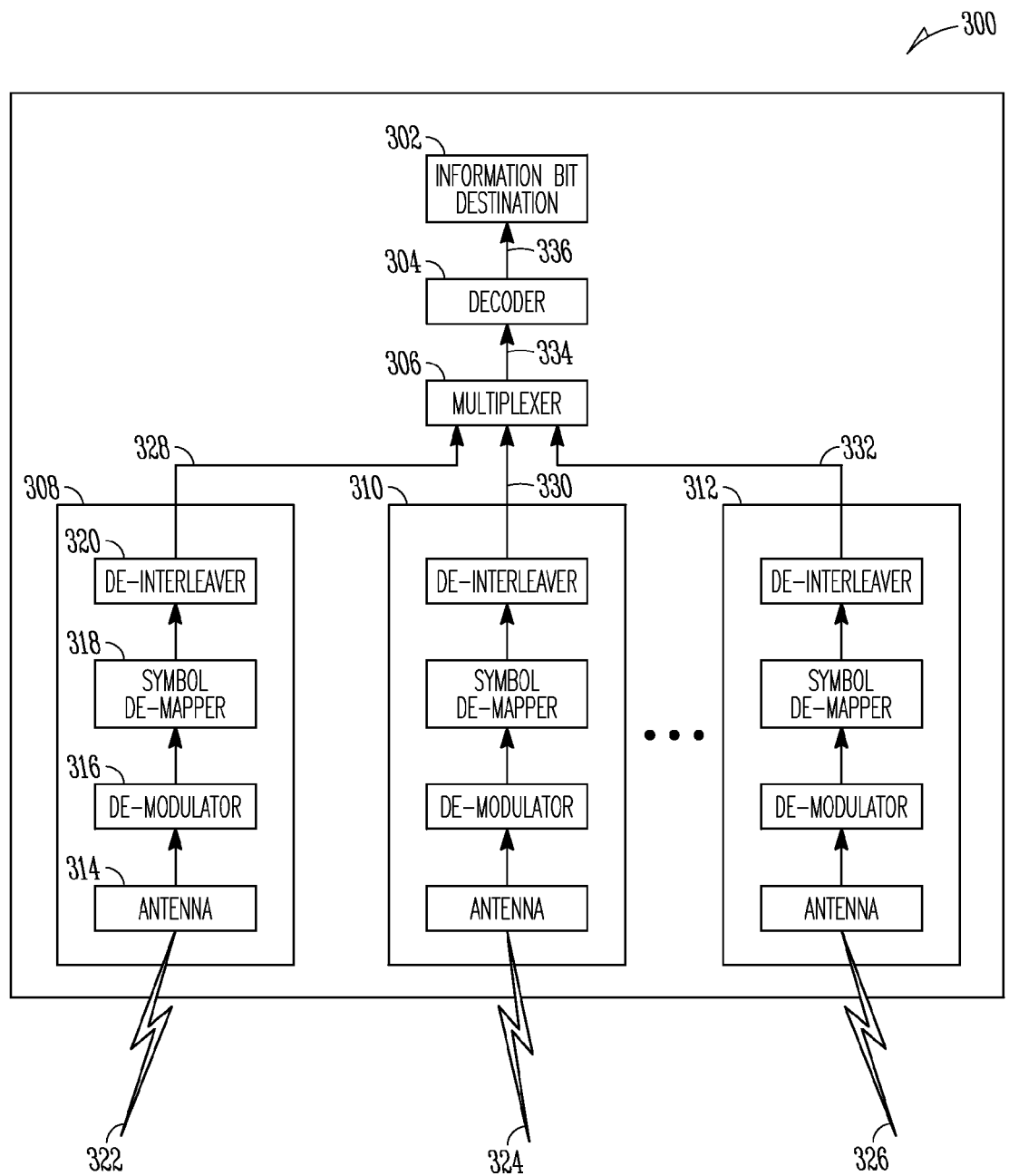
FIG. 3 is a simplified block diagram of a MIMO device capable of receiving, de-modulating, and de-mapping spatially-multiplexed, radio-frequency signals, in accordance with an embodiment of the invention.

A MIMO receiver, which is described in more detail in conjunction with FIG. 3, includes multiple receive antennas. Each receive antenna observes a different, noisy superimposition of faded versions of the $n_T$ transmitted signals 240, 242, 244. Part of the complexity of MIMO communications results from the fact that, at the receiver, a substantial amount of cross-talk can exists between the multiple-data pipes. In a spatial-multiplexing system, the receiver determines the constituent symbol sub-streams, and it produces an estimate of the original symbol stream.

Several different types of linear and non-linear MIMO receivers exist for the purpose of transforming received signal vectors into estimates of transmitted symbol streams. These receiver types include zero-forcing receivers, minimum mean-square error (MMSE) receivers, successive interference canceling (SIC) receivers (e.g., Bell Labs LAyered Space-Time (BLAST) and V-BLAST), maximum likelihood (ML) receivers, and reduced complexity ML receivers, such as sphere decoders.

Each type of receiver has different performance-versus-complexity tradeoffs. For example, linear zero-forcing and MMSE receivers experience significant noise enhancement, and thus these types of receivers are not widely used in MIMO systems. The principles underlying non-linear ML and SIC receivers are discussed briefly below, as these types of receivers can perform more favorably in a MIMO setting.

An ML receiver applies the "ML rule" in order to de-modulate a set of superimposed MIMO symbols. The ML rule is represented by equation (2) as follows:

$$\hat{x} = \arg\min_{x} \|Y - Hx\|^2 \qquad (2)$$

where $\hat{x}=[\hat{x}_0 \hat{x}_1 \ldots \hat{x}_{n_T-1}]^T$ is an estimate of the $n_T \times 1$ transmit signal vector, $Y=[y_0 y_1 \ldots y_{n_R-1}]^T$ is the $n_R \times 1$ receive signal vector, H is the $n_R \times n_T$ channel transfer matrix, and $x=[x_0 x_1 \ldots x_{n_T-1}]^T$ is the $n_T \times 1$ transmit signal vector. Using QAM modulation, $\hat{x}$, Y, and x are vectors of complex modulation symbols.

Using the ML rule, the number of possible MIMO symbols x equals $M^{n_T}$, where M is the number of points in the modulation constellation. For example, a 4×4 16 QAM system (i.e., a 16 QAM system with $n_T=n_R=4$) has $16^4=65,536$ possible MIMO symbol values. Using a full ML search, the number of symbol values is proportional to the number of computations that are performed to reach a solution. Accordingly, a significant disadvantage to full ML de-modulation is that it requires a large number of computations in order to de-modulate symbols that have been modulated using higher-order modulation schemes.

An alternative to ML de-mapping is de-mapping using a SIC algorithm, such as the BLAST or V-BLAST algorithms (referred to collectively as the "BLAST algorithms"). The BLAST algorithms are based on a zero-forcing or MMSE estimator, but with modifications. Using the BLAST algorithm techniques, a strongest symbol (i.e., a symbol with the lowest estimation error variance) is estimated. That symbol is then de-mapped (i.e., the estimated vector is correlated with the nearest constellation point, and the data bits corresponding to the point are obtained). The resulting data bits are then re-mapped to a modulation symbol, and the channel matrix, H, is applied to the remodulated signal. The resulting vector is subtracted from the received vector, Y. The dimension of x is then reduced, a column of H is deleted, and the process is repeated for the next-strongest symbol, until all superimposed symbols have been de-mapped.

Fewer computations need to be performed in order to find a solution using the BLAST algorithms, as opposed to using ML de-mapping. However, the error propagation characteristics of the BLAST algorithms can result in decreased performance, when compared with ML de-mapping.

Embodiments of the invention include de-modulation and de-mapping methods that are less computationally complex than full ML de-mapping. In addition, embodiments of the invention include de-modulation and de-mapping methods that can perform better than BLAST algorithm de-modulation techniques. The de-modulation and de-mapping methods of the various embodiments are referred to herein as "bit-hierarchical" (BH) MIMO de-mapping methods. The term "bit-hierarchical" is used, herein, because embodiments of the invention exploit a hierarchical feature of certain modulations, which is that the modulation can be decomposed into a hierarchal sequence of elementary modulations, with a natural order to the hierarchy. One embodiment of the invention can be applied to QAM with QPSK as the elementary modulation. However, another embodiment of the invention can be applied to PAM with BPSK as the elementary modulation. A BH MIMO de-mapping method, in accordance with the various embodiments, is carried out in a MIMO device that includes a MIMO receiver.

FIG. 3 is a simplified block diagram of a MIMO device 300 capable of receiving and de-modulating spatially-multiplexed, RF signals, in accordance with an embodiment of the invention. In one embodiment, device 300 includes an information bit destination 302, a channel decoder 304, a multiplexer 306, and multiple antenna subsystems 308, 310, 312. Although three receive antenna subsystems 308, 310, 312 are illustrated, more or fewer antenna subsystems can be included, in other embodiments.

Each of the $n_R$ antenna subsystems 308, 310, 312 receives an RF signal 322, 324, 326, which include different noisy superimpositions of faded versions of the $n_T$ transmitted signals (e.g., signals 240, 242, 244, FIG. 2). In accordance with various embodiments, each receive antenna subsystem 308, 310, 312 then de-modulates the received signals 322, 324, 326 and applies a BH MIMO de-mapping technique.

In one embodiment, each receive antenna subsystem 308, 310, 312 includes an antenna 314, a de-modulator 316, a symbol de-mapper 318, and a de-interleaver 320. In another embodiment, a symbol de-mapper and/or de-interleaver can be included in the receiver between decoder 304 and multiplexer 306, rather than within each antenna subsystem 308, 310, 312. Signal processing through one antenna subsystem 308 is described below. It is to be understood that other antenna subsystems 310, 312 can simultaneously perform similar processing.

Antenna 314 receives RF signal 322 from the wireless channel. De-modulator 316 amplifies the RF signal, and it downconverts the signal from an RF frequency to an intermediate frequency or to baseband. De-modulator 316 also converts the signal from the analog domain to the digital domain (e.g., using an FFT). Various filtering procedures can also be performed.

De-modulator 316 further converts the digital signal into a series of received symbol vector representations. This portion of the de-modulator architecture depends on the modulation technology employed. For example, if OFDM is used to de-modulate the symbols, each de-modulator 316 can include a serial-to-parallel (S-to-P) converter (not shown), which applies multiple input samples to an FFT, producing the OFDM sub-band channels, and which produces a number of vectors as an output vector stream. For other modulation techniques, such as CDMA, for example, other de-modulator architectures can be used, as would be obvious to one of skill in the art based on the description herein.

Symbol de-mapper 318 is a symbol-processing element, which receives the received symbol vectors. Based on these vectors, symbol de-mapper 318 performs BH MIMO de-mapping, in accordance with various embodiments of the invention, which are described in detail, below. BH MIMO de-mapping produces an estimate of the $n_T \times 1$ transmit signal vectors, which is represented as $\hat{x}=[\hat{x}_0 \hat{x}_1 \ldots \hat{x}_{n_{T-1}}]$.

In one embodiment, symbol de-mapper 318 further slices the estimated signal vectors to obtain the data bits corresponding to each of the sliced vectors. These "hard decisions" regarding the data bit values are passed to de-interleaver 320, and ultimately to decoder 304.

In another embodiment, symbol de-mapper 318 instead produces "soft decisions" regarding the data bit values, and these soft decisions are stored within registers as a set of per bit log-likelihood ratios (LLRs), approximations of LLRs, or other soft-decision indicators. These soft decision values are made available to decoder 304, which makes the final bit value determinations. Details regarding the BH MIMO de-mapping methods of the various embodiments are provided in detail, below, in conjunction with FIGS. 7-9.

In one embodiment, de-interleaver 320 receives the data bit values or the soft data bit values from symbol de-mapper 318. De-interleaver 320 then reverses the interleaving process that was performed by the transmitter. The de-interleaved data bit values are passed as a sub-stream 328 to multiplexer 306.

Multiplexer 306 combines the multiple sub-streams 328, 330, 332 received from the various receive antenna subsystems 308, 310, 312 in a manner consistent with the de-multiplexing that was performed by the transmitter. This results in a serial stream of data bits 334, which are passed to decoder 304.

Decoder 304 receives the serial bit stream 334, in one embodiment. In an alternate embodiment, decoder 304 receives the soft-decision values (e.g., LLRs, approximations of LLRs, or other soft-decision values). Decoding can include, for example, FEC decoding and/or other decoding techniques. The processes performed by decoder 304 depend on how the data was encoded in the transmitter (e.g., transmitter 200, FIG. 2), prior to transmission over the channel.

Information bit destination 302 receives the decoded bit stream 336, and it consumes, modifies, stores, and/or sends the information to one or more different processing elements or devices. Information bit destination 302 can be, for example but not by way of limitation, a MAC layer of a device. Information bit destination 302 can include, for example, one or more general-purpose or special-purpose processors, ASICs, multi-chip modules, combinations thereof, or other devices.

Figure 4:
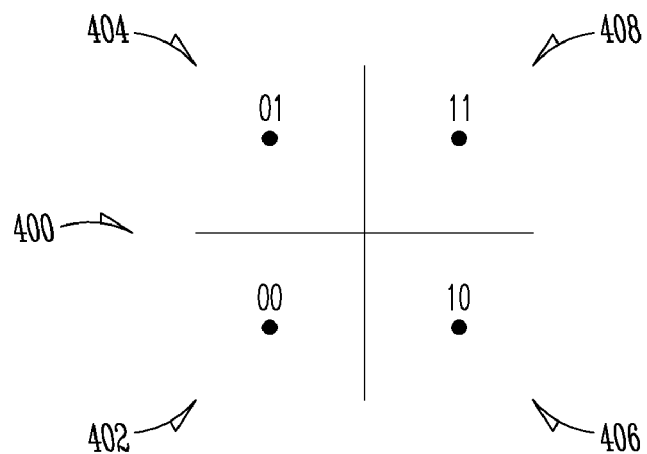
FIG. 4 illustrates a four-point QPSK (quadrature phase shift keying) constellation pattern.
Figure 5:
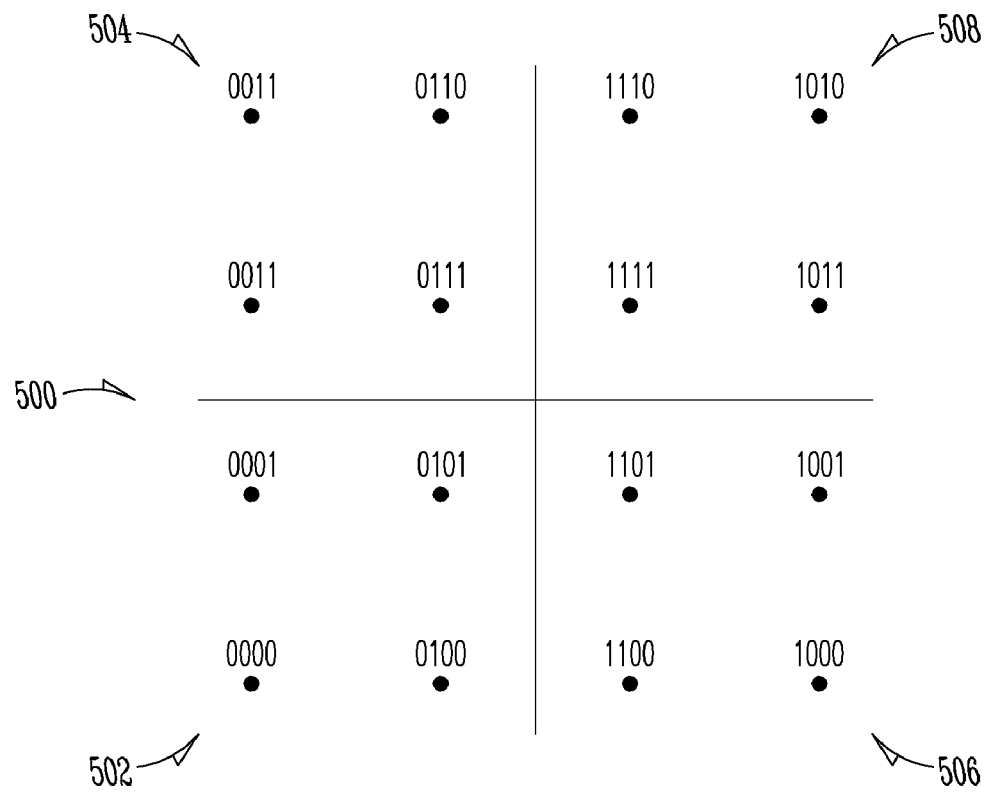
FIG. 5 illustrates a 16 QAM (quadrature amplitude modulation) constellation pattern.

The receiver architecture of FIG. 3 can be used to perform BH MIMO de-modulation and de-mapping, in accordance with various embodiments. De-modulation and de-mapping can be performed for a number of different modulation constellation types. For example, but not by way of limitation, various embodiments can be used to de-modulate and de-map data modulated into PAM constellations (e.g., BPSK) or rectangular QAM constellations including, but not limited to, QPSK, 16 QAM, 64 QAM, 256 QAM, and the like. FIGS. 4-6 illustrate QPSK, 16 QAM, and 64 QAM constellations, respectively. These figures are not intended to limit application of the various embodiments to the illustrated constellations, but instead are included to facilitate explanation of the inventive subject matter.

Using BPSK or QPSK modulation, the phase of a carrier signal varies based upon the value of the data to be transmitted. For example, a binary 1 might be transmitted by generating a 180-degree phase shift in the carrier, whereas a binary 0 could be represented by a 0-degree phase shift. The term "quadrature" in "quadrature amplitude modulation" and "quadrature phase shift keying" comes from the carrier's ability to shift into one of four possible phase ranges (i.e., 0-90, 90-180, 180-270, and 270-360 degrees) based on bit values of the data to be transmitted.

FIG. 4 illustrates a four-point QPSK constellation pattern 400. Each point in the pattern resides in one of four quadrants 402, 404, 406, 408, and each point can be represented by a complex symbol vector. Because the constellation includes four points, the constellation can be used to encode four dibit combinations. The dibit combination that corresponds to a particular point can be determined through a mapping/de-mapping process. For example, the constellation point residing in quadrant 402 can correspond to a dibit value of "00," as illustrated in FIG. 4. Other example 2-bit mappings are illustrated in FIG. 4 in association with each constellation point.

FIG. 5 illustrates a 16 QAM constellation pattern 500. 16 QAM modulation uses various combinations of phase shifts and amplitudes to produce a pattern 500 that includes four points per quadrant 502, 504, 506, 508. Each of the 16 total points can be mapped to a specific 4-bit combination. Various 4-bit mappings are illustrated in FIG. 5 in association with each constellation point.

FIG. 6 illustrates a 64 QAM constellation pattern 600. 64 QAM modulation uses various combinations of phase shifts and amplitudes to produce a pattern 600 that includes 16 points per quadrant 602, 604, 606, 608. In this case, each of the 64 points can be mapped to a specific 6-bit combination. Various 6-bit mappings are illustrated in FIG. 6, in association with each constellation point.

The methods and apparatus of the various embodiments are described in conjunction with rectangular QAM modulations (e.g., QPSK, 16 QAM, 64 QAM, etc.), although the methods and apparatus can be applied to BPSK modulations, as well. The parameter, m, is used herein to indicate the modulation order. The number of signal constellation points is $4^m$. Thus, m=1 is QPSK, m=2 is 16 QAM, m=3 is 64 QAM, and so on.

One MIMO symbol will transmit $n_T 4^m$ bits. These bits can be ordered in 2m vectors according to equations (3):

$$i_k = \begin{bmatrix} i_{k,0} \\ \vdots \\ i_{k,n_T} \end{bmatrix} \text{ and } q_k = \begin{bmatrix} q_{k,0} \\ \vdots \\ q_{k,n_T} \end{bmatrix}, k = 0, \ldots, m-1 \quad (3)$$

QPSK vectors are defined according to equation (4):

$$x_k(i_k, q_k) = \begin{bmatrix} (2i_{k,0} - 1) + j(2q_{k,0} - 1) \\ \vdots \\ (2i_{k,n_T-1} - 1) + j(2q_{k,n_T-1} - 1) \end{bmatrix} \quad (4)$$

Each of the elements of the QPSK vectors are ±1±j, in one embodiment. Accordingly, the QAM MIMO symbols can be written as equation (5):

$$x(i_0, q_0, \ldots, i_{m-1}, q_{m-1}) = \quad (5)$$
$$2^{m-1}\Delta x_0(i_0, q_0) + 2^{m-1}\Delta x_1(i_1, q_1) + \ldots + \Delta x_{m-1}(i_{m-1}, q_{m-1})$$

where 2Δ is the free Euclidean distance of the QAM constellation (that is, the distance between nearest neighbor constellation points). Various constellations can be written in this format, although actual bit mappings involve a transformation to the i and q vectors.

Methods of the various embodiments include a sequence of decisions, followed by interference cancellation. However, unlike prior-art SIC algorithms, which de-map modulation symbols sequentially, methods of the various embodiments perform sequential elemental searches (e.g., QPSK searches) to de-map vectors of elementary modulation symbols $x_0$, $x_1$, $x_2$, ... (e.g., QPSK symbols). In other words, methods of the various embodiments de-modulate higher-order bits of all modulation symbols, cancel interference to reduce the modulation order, and repeat this process until the modulation order is reduced to the elemental constellation.

The basic method of various embodiments of the invention can be represented by the following pseudo-code:

$$\text{Initialize } \tilde{Y}_{-1} = (2^{m-1}\Delta)^{-1} Y \text{ and } \hat{x}_{-1} = 0; \quad (6)$$

for (k = 0; k < m; k++){

$$\tilde{Y}_k = \frac{1}{2}(\tilde{Y}_{k-1} - \hat{x}_{k-1}); \quad (7)$$

$$\hat{x}_k = \underset{\text{QPSK vectors } x}{\arg\min} \|\tilde{Y}_k - Hx\|^2; \quad (8)$$

} where $\tilde{Y}_k$ is a scaled version of the received signal vector at each search level k, $\hat{x}_k$ is the QPSK vector at each search level k, H is the channel transfer matrix, and x is the transmit signal vector. As will be described in more detail below, equation (6) represents an initialization process, equation (7) cancels higher-order interference and scales the received signal vector data, and equation (8) represents a level-k QPSK search.

As the above algorithm indicates, the number of points searched in order to arrive at a result is substantially less than the number of points searched when using a full ML search. For the basic algorithm given in equations (6-8), the number of search points is approximately $m4^{n_T}$, as opposed to $4^{mn_T}$ for a full ML search. For example, for $n_T=4$ and m=2 (i.e., 16 QAM), a full ML search will search 65,536 points. A basic search, in accordance with an embodiment of the invention, completes this search with approximately 512 points. Accordingly, a substantial reduction in the number of search points is achieved using methods of various embodiments of the invention.

Figure 7:
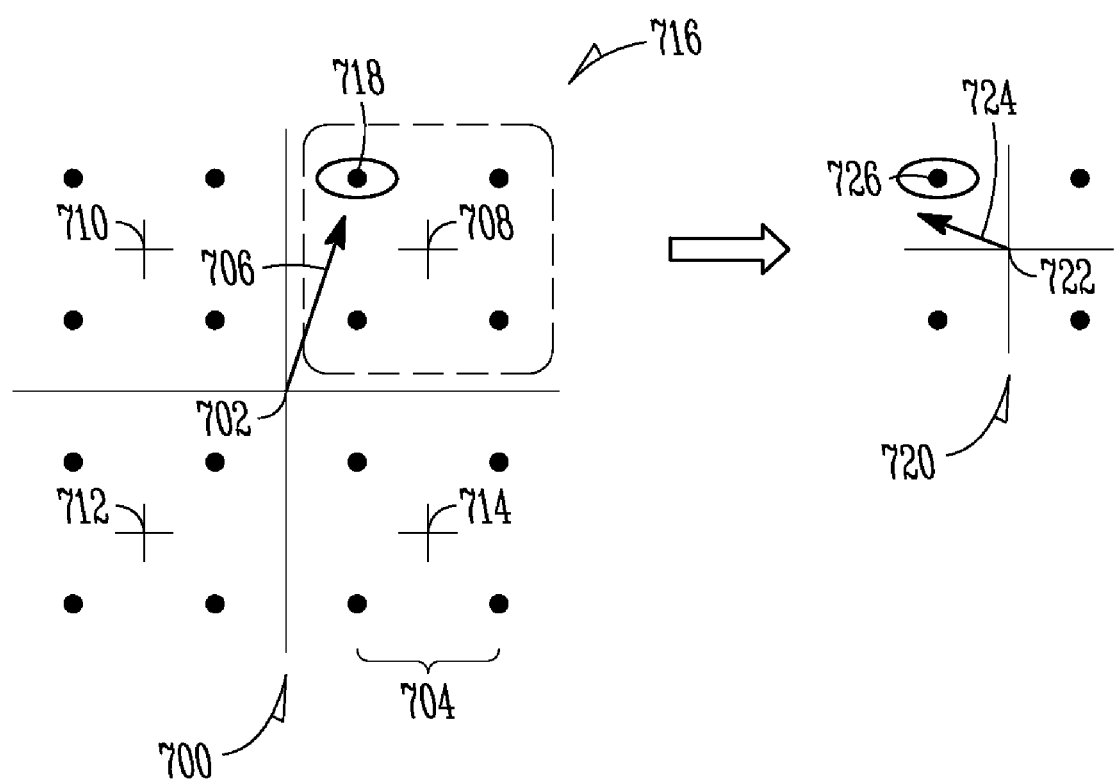
FIG. 7 illustrates bit-hierarchical MIMO de-mapping of a single received vector element within a 16 QAM constellation, in accordance with an embodiment of the invention.

FIG. 7 illustrates BH MIMO de-mapping of a single received vector element within a 16 QAM constellation 700, in accordance with an embodiment of the invention. Although FIG. 7 is a two-dimensional constellation representation, it is to be understood that the figure depicts an example for de-mapping one element of a received signal vector, Y.

In a MIMO system, the received signal vector, Y, includes a number of vector elements equal to the number of transmit antennas. In an embodiment of the invention, a BH MIMO de-mapping method involves identifying one or more quadrants within which the multiple vector elements of the received signal vector, Y, are located. Accordingly, the actual constellation representation would have multiple complex dimensions, and only one complex dimension is shown in FIG. 7. FIG. 7 is illustrated in two real dimensions and for one complex signal vector element for the purpose of clarity of description. One of skill in the art would understand, based on the description herein, how conceptually to extend the depiction in FIG. 7 to apply to multi-element de-mapping.

One should understand, based on the description herein, that the QPSK vector search of equation (8) includes finding the closest QPSK vector in the multi-dimensional MIMO symbol space as distorted by the channel matrix H, and not just one element or element-by-element (for example, as in SIC). In fact, due to the cross-talk elements in the channel matrix H, element-by-element minimum distance results are not likely to agree with the QPSK vector solution of equation (8). It is intended that the inventive subject matter encompass de-mapping of multiple elements of a received signal vector, Y, within a multi-dimensional constellation space. Nonetheless, FIG. 7 is useful for understanding basic concepts of the inventive subject matter.

Referring FIG. 7, a 16 QAM constellation 700 is shown, with an initial origin 702 indicated roughly in the center of the constellation. The constellation is divided into multiple quadrants (e.g. quadrant 716). The constellation's symbols are represented by points (e.g., point 718). In one embodiment, symbols are vertically and horizontally separated by the free Euclidian distance 704 of 2Δ. Symbols could be separated by different horizontal and/or vertical distances, in other embodiments. The value of 2Δ is used for purposes of explanation, and not of limitation.

A received signal vector is indicated by arrow 706. For ease of description, the received signal vector 706 corresponds to one element of a received signal vector, Y. As FIG. 7 illustrates, vector 706 indicates a data point that is located in proximity to symbol 718.

In one embodiment, during a first iteration of a BH MIMO de-mapping method, a first-level QPSK search is performed to determine at least one quadrant proximate to the received signal vector 706. The "+" marks 708, 710, 712, 714 indicate first-level QPSK vectors, $2\Delta x_0$, for the first-level QPSK search. In the illustrated example, a QPSK vector corresponding to "+" mark 708 is identified as a result of the first-level search. "+" mark 708 identifies quadrant 716.

In one embodiment, the search space is then constricted to a reduced search space 720, which includes the constellation points located within the identified quadrant 716. The reduced search space can be represented by the QPSK constellation 720, which has a new origin 722 located in the center of the constellation 720. Because the constellation has been reduced to a QPSK constellation, the constellation points now correspond to the QPSK vectors, $2\Delta x_1$. These vectors are normalized, in one embodiment.

The received signal vector is transformed to the new origin 722, in one embodiment. This transformation to a new origin corresponds to the operation of equation (7) of the pseudo-code representation, which is described above. In addition, the received signal vector is scaled to account for the normalization of the QPSK vectors. The transformed and scaled vector is indicated as vector 724.

A lower-level QPSK search is performed, based on the reduced search space 720 and the transformed and scaled vector 724, to determine at least one sub-quadrant proximate to vector 724. In the illustrated example, a QPSK vector corresponding to constellation point 726 is identified as a result of the lower-level search. Because this is the lowest-level search (i.e., the constellation points correspond to the QPSK vectors), constellation point 726 is identified as the de-mapped symbol.

Constellation point 726 indicates a point that exists within reduced search space 720. Therefore, to identify the actual symbol within the full constellation, a determination is made of the symbol, within the original 16 QAM constellation 700, that constellation point 726 corresponds to. In the illustrated example, constellation point 726 corresponds to symbol 718. Accordingly, the received signal vector can be de-mapped to symbol 718.

FIG. 7, as described above, illustrates BH MIMO de-mapping within a 16 QAM constellation. The example can be expanded to lower-level or higher-level constellations. For example, in a 64 QAM constellation, a first-level QPSK search for a single received vector element can identify a quadrant with 16 constellation points. The search space is reduced to the identified quadrant, a new origin is identified, the data is transformed and scaled, and a second-level QPSK search is performed. The second-level QPSK search can identify a sub-quadrant with 4 constellation points. Once again, the search space is reduced to the identified sub-quadrant, another new origin is identified, the data is again transformed and scaled, and a third-level QPSK search is performed. The third-level QPSK search results in the identification of a final constellation point. The correspondence between the final point and a symbol within the original constellation is determined, and the received vector element is de-mapped to the identified symbol. It would be obvious to one of skill in the art, based on the description herein, how to extend the inventive subject matter to even higher-level constellations (e.g., 256 QAM and up).

The sequence of search operations, described above, depends only on the hierarchal nature of the QAM constellation points, and not on the bit mappings to those points. However, for certain, specific, bit-to-modulation symbol mappings, such as those illustrated in FIGS. 4-6, the decisions at each level of the hierarchal search can directly identify specific bits.

Figure 8:
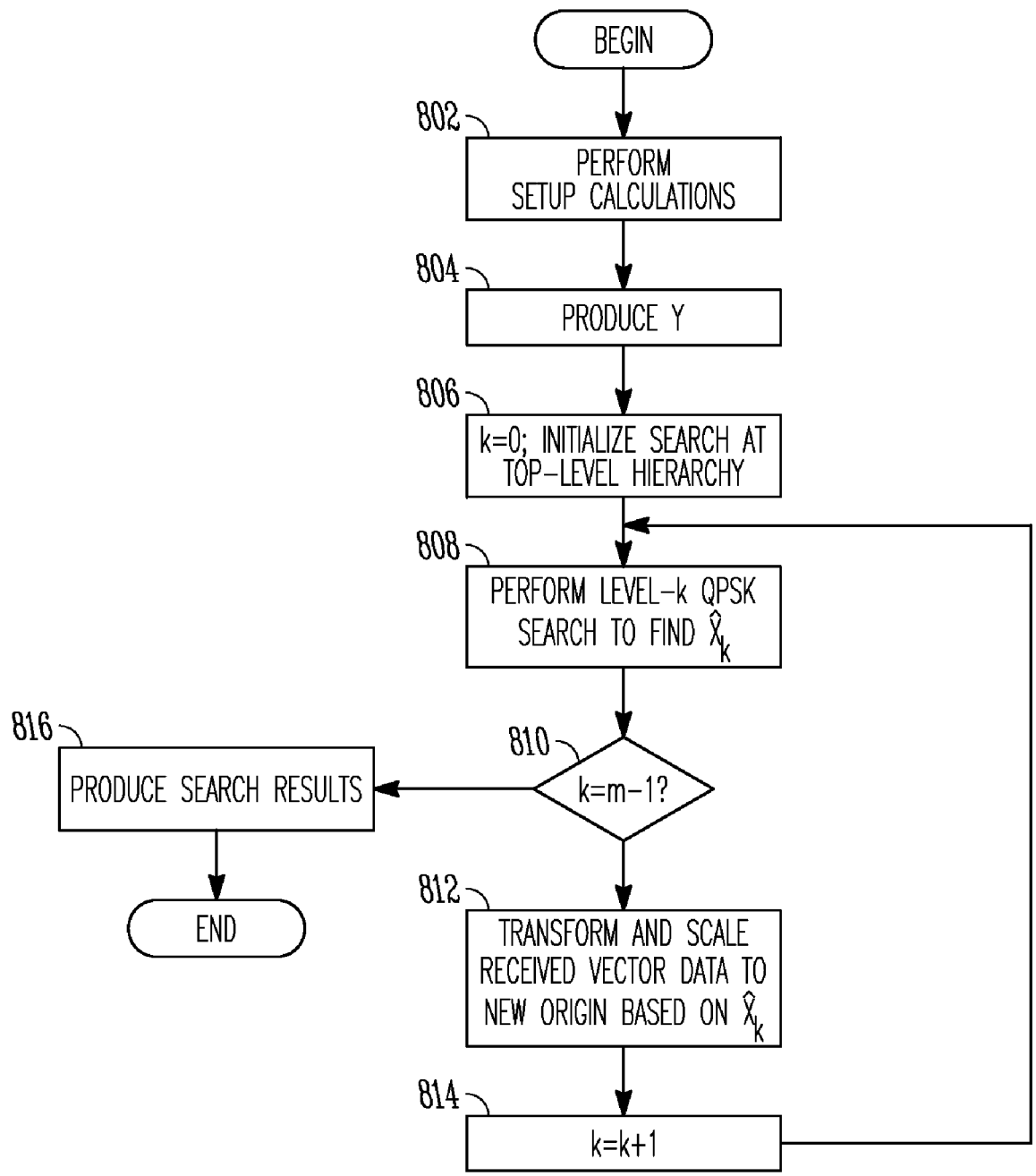
FIG. 8 is a flowchart of a procedure for performing bit-hierarchical MIMO de-mapping, in accordance with an embodiment of the invention.

FIG. 8 is a flowchart of a procedure for performing BH MIMO de-mapping, in accordance with an embodiment of the invention. Although the individual operations of the procedure of FIG. 8 are illustrated and described as separate operations, one or more of the individual operations may be performed concurrently. Further, nothing requires that the operations be performed in the orders illustrated.

The method begins, in block 802, by performing setup calculations. The setup calculations are a function of H. The setup calculations can be one-time calculations, which may not be repeated as successive MIMO vector symbols are de-mapped, and which may not actually depend on the noisy received signal vector, Y. For example, in equation (8), the Hx values are the same for all symbols transmitted over the same channel H and for all levels of the hierarchal search. Thus, these Hx values can be calculated once and stored for reuse. In addition, mathematical manipulations of the basic Euclidean distance in equation (8) can lead to alternative but equivalent forms of this expression, which may lead to more efficient implementations. The setup calculations of block 802 may support such variants.

In block 804, a multi-antenna receiver (e.g., a MIMO receiver) produces a received signal vector, Y, of $n_R$ complex de-modulation symbols, where each element of Y corresponds to a distinct receive antenna, and each element indicates a superimposition of faded versions of $n_T$ transmitted signals.

In block 806, a loop variable k is initialized to a value of 0. The loop variable k is used to step through various levels of QPSK searches, and to indicate when the loop should terminate (e.g., when the lowest-level QPSK search is completed).

Also in block 806, the search space for the first QPSK search is initialized to a top-level hierarchy, by defining the top-level QPSK vector $\hat{x}_k=0$. In one embodiment, the top-level hierarchy includes the full constellation. For example, if the elements of the transmitted vector, x, correspond to a 16 QAM constellation, than the search space is initialized to a 16 QAM constellation, with an origin at approximately the center of the constellation.

In block 808, a level-k QPSK search is performed to find $\hat{x}_k$. In one embodiment, the level-k QPSK search is performed according to equation (8), above. The results of the search are at least temporarily stored.

A determination is then made, in block 810, whether k=m−1, where m is the modulation order (e.g., m=1 for QPSK, m=2 for 16 QAM, m=3 for 16 QAM, etc.). If not, then in block 812, the data elements within the received signal vector, Y, are transformed to a new origin and scaled to correspond to a reduced search space that substantially includes the one or more quadrants identified in block 808. The data vector is normalized, so that the next QPSK search is performed using ±1 symbols. This results in a scaled, received signal vector, $\tilde{Y}$.

Loop variable k is incremented by 1, in block 814, and the procedure iterates. In particular, block 808 is repeated, during which a level-k QPSK search is performed within the reduced search space, to find a new $\hat{x}_k$.

Blocks 808, 810, 812, and 814 are repeated until it is determined, in block 810, that k=m−1. At that time, in block 816, the results of the search are produced based on the lowest-level QPSK search performed, and the method ends.

In one embodiment, the search results include "hard decisions." Hard decisions correspond to specific indications of which bit values correspond to the symbols identified in the lowest-level QPSK search.

In another embodiment, "soft decisions" are produced, which are used by a decoder (e.g., decoder 304, FIG. 3) to produce the final determination of the bit values. In one embodiment, the soft decisions include a set of LLRs or approximations of LLRs (e.g., the difference-min-distance rule, described below, or equivalent calculations).

An approximation to the exact (log-MAP) LLR calculation is a rule referred to as the "difference-min-difference" rule. This approximation is derived from the so-called log-MAX approximation as applied to the exact log-likelihood formula. For a given bit, $b_x$, this rule is given as equation (9):

$$LLR(b_x) = \frac{1}{2\sigma_n^2}\left\{\arg\min_{x:b_x=0}\|Y - Hx\|^2 - \arg\min_{x:b_x=1}\|Y - Hx\|^2\right\} \quad (9)$$

where $\sigma_n$ is the additive noise variance per element of the Y vector.

According to this embodiment, the arg $\min_{x:b_x=0/1}\|Y-Hx\|^2$ values are found and stored (e.g., in registers) as part of the QPSK sub-searches. The result is that some of the final values applied to equation (9) are true QAM constellation points, and some come from higher-order QPSK search results. However, the lowest-level searches check nearest neighbor points. Therefore, the accuracy of these embodiments can be increased on the nearest-neighbor alternative LLRs. When the bit-value alternative is not a nearest neighbor, the LLR values are larger, and the decoding process is insensitive to approximation errors in these cases.

The flowchart of FIG. 8 indicates a basic BH MIMO de-mapping method, in accordance with one embodiment. At each level of the hierarchal search, a single QPSK vector search is performed. In other embodiments, the algorithm is extended to include any of several tree-searching techniques, where multiple QPSK searches may be performed during an iteration.

Tree-searching algorithms are known, although they have not been applied in the context of the inventive subject matter. In one embodiment, an M-algorithm tree search is incorporated into one or more levels of QPSK searching, during which the "M" best QPSK vectors are identified for inclusion in the reduced search space for the subsequent iteration (if any); that is, the M QPSK vectors with the smallest Euclidean distance values $\|Y-Hx\|$. In another embodiment, a T-algorithm tree search is incorporated into one or more levels of QPSK searching, during which those QPSK vectors having Euclidean distance values that fall within a threshold, T, of the best QPSK vector are identified for inclusion in the reduced search space for the subsequent iteration (if any).

Figure 9:
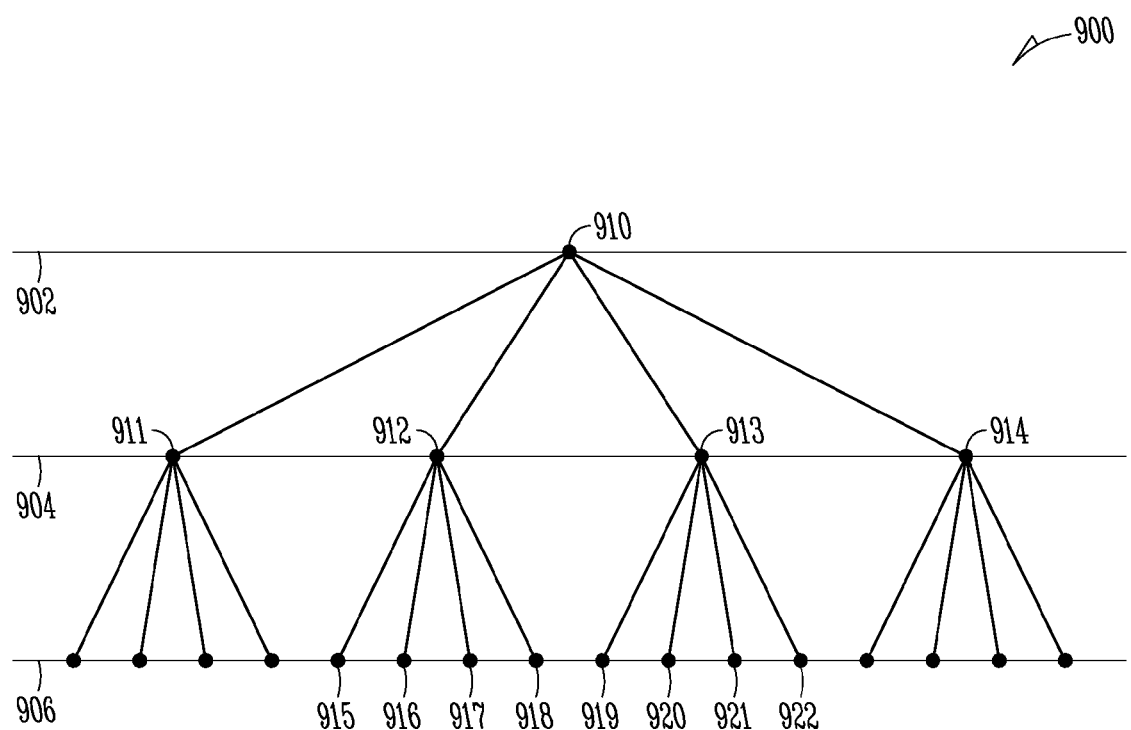
FIG. 9 is an example of a tree diagram, which depicts a tree-searching algorithm that can be incorporated into various embodiments of the invention.

FIG. 9 is an example of a tree diagram 900, which depicts a tree-searching algorithm that can be incorporated into various embodiments of the invention. Tree diagram 900 includes three levels 902, 904, 906. At the root 910 of the tree, a highest-level QPSK search is performed, to identify the W possible QPSK search values, with respect to the received search vector Y. W indicates the number of possible search values at each level, or the number of "branches." Accordingly, for the initial QPSK search at level 902, $W=4^{n_T}$. For example, if there are $n_T=3$ transmit antennas, then there are 64 branches per node in the tree. FIG. 9 illustrates the case of only 4 branches per node.

At level 904, the results of the initial QPSK search are stored at nodes 911, 912, 913, 914. Each node corresponds to a quadrant of the scaled QPSK constellation. Within each quadrant, in accordance with the various embodiments, it is possible to perform a lower-level QPSK search. Accordingly, four branches extend from each node 911, 912, 913, 914, and the tree width W=16 at this level.

At this point, it is possible to "prune" the branches to reduce the search. For an M-algorithm, for example, it is possible to select the M best nodes. For a T-algorithm, the selected nodes include the node with the best value, and any nodes having values that fall within a threshold, T, of the best node's value. The search is continued for the branches corresponding to the selected nodes, and the remaining branches are pruned (i.e., the search is not continued within the corresponding quadrants).

For example, if an M-algorithm tree search is being performed with M=2, and nodes 912 and 913 include the two best values, then the search space is reduced to the two corresponding quadrants. Within each of these quadrants, an additional QPSK search is performed using data that has been transformed and scaled accordingly. Eight search result values are produced, which are stored in nodes 915, 916, 917, 918, 919, 920, 921, and 922. Assuming that this is the lowest level of search, the best result can then be determined.

Using a tree-searching technique, one or more branches can be retained for lower-level QPSK searches at any or all search levels. For M-algorithm and T-algorithm searches, respectively, the value of M or T can be the same at each search level, or it can change at each level. For example, using the M-algorithm, the value of M can equal two during the highest-level QPSK search, and that value can be reduced to one for each subsequent, lower-level search. In other embodiments, other types of tree-searching algorithms can be incorporated into the searching algorithm, as would be obvious to one of skill in the art based on the description herein.

Extended algorithms in accordance with various embodiments can be described mathematically. Let $\hat{x}_k^{(l)}$ denote the ranked results of the level-k search, as given in equation (10):

$$\|\tilde{Y}_k - H\hat{x}_k^{(0)}\|^2 \le \|\tilde{Y}_k - H\hat{x}_k^{(1)}\|^2 \le \ldots \quad (10)$$

Then at level k+1, a QPSK search is performed for all level-k solutions $\hat{x}_k^{(l)}$, such that equation (11) is satisfied:

$$\|\tilde{Y}_k - H\hat{x}_k^{(l)}\|^2 \le \gamma\|\tilde{Y}_k - H\hat{x}_k^{(0)}\|^2 \quad (11)$$

where $\gamma$ is the breadth parameter used in the T-algorithm. Increasing the value of $\gamma$ expands the search space. This extended algorithm can be viewed as a tree search, which includes branch and prune aspects.

Thus, various embodiments of methods and apparatus for de-modulating and de-mapping MIMO symbols have been described. The inventive subject matter can be implemented in a number of different types of systems in various embodiments, including WLAN systems, other wireless networks, terrestrial cellular telephone, satellite cellular telephone, radio systems, paging systems, and other types of systems. Other embodiments will be readily apparent to those of ordinary skill in the art.

The inventive subject matter is not to be construed as being limited to any particular architecture or combination of functional elements or integrated circuits. The inventive subject matter's use is extremely flexible, being readily adaptable to any electronic system in which its advantages are desired to be achieved. The systems and devices depicted in the figures are merely examples of electronic systems and devices in which the inventive subject matter can be used.

Many variations of the apparatus diagrams appearing in the drawings will be apparent to those skilled in the art having the benefit of this disclosure. For example, although the description and figures illustrate application of the embodiments in systems that use 4×4 16 QAM modulation, embodiments of the invention can be used in systems that use numerous other modulation schemes, as well. For example, the signals may be PAM modulation or M-PSK modulation.

The various structures of the inventive subject matter may be implemented according to any of various elements and methods known to those skilled in the art. There may be intermediate structure (e.g., amplifiers, attenuators, mixers, multiplexers, inverters, buffers, etc.) or signals that are between two illustrated structures. Some conductors may not be continuous as illustrated, but rather they may be broken up by intermediate structure. The borders of boxes in the figures are for illustrative purposes only. An actual device would not have to include such defined boundaries. Further, the relative layouts of the illustrated elements are not to suggest actual relative layouts.

The various procedures described herein can be implemented in hardware, firmware or software. A software implementation could use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, random access memories (RAMs), read only memories (ROMs), and the like.

The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Therefore, it is manifestly intended that the inventive subject matter be limited only by the claims and the equivalents thereof.

It is emphasized that the Abstract is provided to comply with 37 C.F.R. §1.72(b), which requires an Abstract that will allow a reader to ascertain the nature and gist of the technical disclosure. The Abstract is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate preferred embodiment.

What is claimed is:

1. A method for demapping symbols comprising:
performing a first elemental search over a highest-order elementary modulation on a received signal vector that includes multiple elements, wherein the first elemental search is performed within a first search space and produces an identified vector of elementary modulation symbols;
transforming the received signal vector to a new origin that corresponds to the identified vector, resulting in a transformed, received signal vector;
performing a subsequent elemental search on the transformed, received signal vector, wherein the subsequent elemental search is performed within a reduced search space defined by the identified vector, and wherein the subsequent elemental search produces a next identified vector of elementary modulation symbols; and
producing demapped bit values that correspond to a next identified vector of elementary modulation symbols of a lowest-level search.

2. The method of claim 1, wherein the received signal vector is modulated using quadrature amplitude modulation, and quadrature phase shift keying is an elementary modulation.

3. The method of claim 1, wherein the received signal vector is modulated using pulse amplitude modulation, and binary phase shift keying is an elementary modulation.

4. A method for demapping symbols comprising:
performing a first quadrature phase shift keying (QPSK) search on a received signal vector that includes multiple elements, wherein the first QPSK search is performed within a first search space and produces an identified QPSK vector;
transforming the received signal vector to a new origin that corresponds to the identified QPSK vector, resulting in a transformed, received signal vector;
performing a subsequent QPSK search on the transformed, received signal vector, wherein the subsequent QPSK search is performed within a reduced search space defined by the identified QPSK vector, and wherein the subsequent QPSK search produces a next identified QPSK vector; and
producing search results that include de-mapped bit values corresponding to a QPSK vector identified as a result of a lowest-level search.

5. The method of claim 4, further comprising:
producing the received signal vector, wherein each of the multiple elements corresponds to a signal received by one of multiple receive antennas of a multiple-input multiple-output receive antenna array.

6. The method of claim 4, further comprising:
scaling the transformed, received signal vector, prior to performing the subsequent QPSK search.

7. The method of claim 4, further comprising:
until the subsequent QPSK search results in a next identified QPSK vector that corresponds to a constellation point,
repeating transforming the transformed, received signal vector; and
repeating performing the subsequent QPSK search.

8. The method of claim 4, further comprising:
incorporating a tree-searching algorithm into either or both the first QPSK search and the subsequent QPSK search to produce multiple identified QPSK vectors that are used to define the reduced search space.

9. The method of claim 8, wherein incorporating the tree-searching algorithm comprises:
incorporating a tree search into a QPSK search in which a number of the identified QPSK vectors with smallest Euclidian distance values are included in the reduced search space for a subsequent iteration.

10. The method of claim 8, wherein incorporating the tree-searching algorithm comprises:
incorporating a tree search into a QPSK search in which a number of the identified QPSK vectors with Euclidian distance values that fall with a threshold of a best of the identified QPSK vectors are included in the reduced search space for a subsequent iteration.

11. The method of claim 4, further comprising:
producing search results that include at least one soft decision for use by a decoder.

12. The method of claim 11, wherein producing the search results comprises:
producing the at least one soft decision as a set of log-likelihood ratios or approximations of log-likelihood ratios.

13. A method comprising:
performing a first quadrature phase shift keying (QPSK) search on a received signal vector, Y, which includes multiple elements, wherein the first QPSK search is performed within a first search space and produces an identified QPSK vector; and
until a reduced search space corresponds to a QPSK constellation,
canceling higher-order interference based on the identified QPSK vector and scaling the multiple elements within the received signal vector according to $$\tilde{Y}_k = \frac{1}{2}(\tilde{Y}_{k-1} - \hat{x}_{k-1}),$$

where $\tilde{Y}_k$ is a scaled version of the received signal vector at search level k, and $\hat{X}_k$ is a QPSK vector at search level k, and performing a level-k QPSK search according to $$\hat{x}_k = \underset{\text{QPSK vectors } x}{\arg\min} \|\tilde{Y}_k - Hx\|^2,$$

where is a channel transfer matrix, and x is a transmit signal vector.

14. The method of claim 13, further comprising:
incorporating a tree-searching algorithm into either or both the first QPSK search and the level-k QPSK search to produce multiple identified QPSK vectors that are used to define the reduced search space.

15. The method of claim 13, further comprising:
producing search results that include at least one soft decision for use by a decoder.

16. The method of claim 15, wherein producing the search results comprises:
producing the at least one soft decision as a set of log-likelihood ratios or approximations of log-likelihood ratios.

17. The method of claim 13, further comprising:
producing search results that include de-mapped bit values corresponding to a QPSK vector identified as a result of a lowest-level search.

18. A computer-readable medium having computer program instructions stored thereon which, when executed within a multiple-input multiple-output device, results in:
performing a first quadrature phase shift keying (QPSK) search on a received signal vector that includes multiple elements, wherein the first QPSK search is performed within a first search space and produces an identified QPSK vector;
transforming the received signal vector to a new origin that corresponds to the identified QPSK vector, resulting in a transformed, received signal vector; and
performing a subsequent QPSK search on the transformed, received signal vector, wherein the subsequent QPSK search is performed within a reduced search space defined by the identified QPSK vector, and wherein the subsequent QPSK search produces a next identified QPSK vector; and
producing search results that include de-mapped bit values corresponding to a QPSK vector identified as a result of a lowest-level search.

19. The computer-readable medium of claim 18, wherein execution of the instructions further results in:
incorporating a tree-searching algorithm into either or both the first QPSK search and the subsequent QPSK search to produce multiple identified QPSK vectors that are used to define the reduced search space.

20. The computer-readable medium of claim 18, wherein execution of the instructions further results in:
producing search results that include at least one soft decision for use by a decoder.

21. An apparatus comprising:
multiple receive antennas operable to receive multiple received signals; and
a symbol-processing element, operable to
perform a first quadrature phase shift keying (QPSK) search on a received signal vector that includes multiple elements corresponding to the multiple received signals, wherein the first QPSK search is performed within a first search space and produces an identified QPSK vector;
transform the received signal vector to a new origin that corresponds to the identified QPSK vector, resulting in a transformed, received signal vector; and
perform a subsequent QPSK search on the transformed, received signal vector, wherein the subsequent QPSK search is performed within a reduced search space defined by the identified QPSK vector, and wherein the subsequent QPSK search produces a next identified QPSK vector.

22. The apparatus of claim 21, wherein the symbol-processing element is further operable to:
incorporate a tree-searching algorithm into either or both the first QPSK search and the subsequent QPSK search to produce multiple identified QPSK vectors that are used to define the reduced search space.

23. The apparatus of claim 21, wherein the symbol-processing element is further operable to:
produce search results that include at least one soft decision for use by a decoder.

24. The apparatus of claim 21, wherein the symbol-processing element is further operable to:
produce search results that include de-mapped bit values corresponding to a QPSK vector identified as a result of a lowest-level search.

25. A multiple-input multiple-output communication device, comprising:
- multiple receive antennas operable to receive multiple received signals; and
- a symbol-processing element, operable to
- perform a first quadrature phase shift keying (QPSK) search on a received signal vector that includes multiple elements corresponding to the multiple received signals, wherein the first QPSK search is performed within a first search space and produces an identified QPSK vector;
- transform the received signal vector to a new origin that corresponds to the identified QPSK vector, resulting in a transformed, received signal vector; and
- perform a subsequent QPSK search on the transformed, received signal vector, wherein the subsequent QPSK search is performed within a reduced search space defined by the identified QPSK vector, and wherein the subsequent QPSK search produces a next identified QPSK vector.

26. The multiple-input multiple-output communication device of claim 25, wherein the symbol-processing element is further operable to:
- incorporate a tree-searching algorithm into either or both the first QPSK search and the subsequent QPSK search to produce multiple identified QPSK vectors that are used to define the reduced search space.

27. The multiple-input multiple-output communication device of claim 25, wherein the symbol-processing element is further operable to:
- produce search results that include at least one soft decision for use by a decoder.

28. The multiple-input multiple-output communication device of claim 25, wherein the symbol-processing element is further operable to:
- produce search results that include de-mapped bit values corresponding to a QPSK vector identified as a result of a lowest-level search.

* * * * *

UNITED STATES PATENT AND TRADEMARK OFFICE
CERTIFICATE OF CORRECTION

PATENT NO. : 7,308,047 B2
APPLICATION NO. : 10/750169
DATED : December 11, 2007
INVENTOR(S) : Sadowsky It is certified that error appears in the above-identified patent and that said Letters Patent is hereby corrected as shown below:

In column 17, line 48, in Claim 13, after "where" insert -- H --.

Signed and Sealed this

Twenty-seventh Day of May, 2008

JON W. DUDAS
*Director of the United States Patent and Trademark Office*